United States Patent Office

3,848,013
Patented Nov. 12, 1974

3,848,013
METHOD FOR PRODUCING BENZENE, TOLUENE AND POLYMETHYL BENZENES
Naoya Kominami and Kiyoshi Kitamura, Tokyo, Japan, assignors to Asahi Kasei Kogyo Kabushiki Kaisha, Osaka, Japan
No Drawing. Continuation-in-part of application Ser. No. 222,382, Jan. 31, 1971, which is a continuation of application Ser. No. 63,318, Aug. 12, 1970, both now abandoned. This application Aug. 24, 1972, Ser. No. 283,561
Claims priority, application Japan, Aug. 14, 1969, 44/63,852; Aug. 25, 1969, 44/66,502
Int. Cl. C07c 3/58
U.S. Cl. 260—672 R                6 Claims

ABSTRACT OF THE DISCLOSURE

Benzene, toluene and polymethyl benzenes are produced by vapor phase treatment of feed stocks containing aromatic hydrocarbons, particularly feed stocks obtained by catalytic reforming of naphtha with a novel catalyst mainly comprising magnesium silicofluoride treated alumina containing 0.01% to 10% by weight of fluorine and 0.01% to 10% of magnesium at an elevated temperature.

---

This application is a continuation in part of our co-pending application Ser. No. 222,382 filed Jan. 31, 1972, which in turn is a continuation of our application Serial Number 63,318 filed Aug. 12, 1970 both of which are now abandoned.

BACKGROUND OF INVENTION

This invention concerns a method for producing benzene, toluene and polymethyl benzenes. More particularly, it relates to a method for producing these valuable compounds by contacting a hydrocarbon oil mixture predominantly containing aromatic hydrocarbons such as a reformate obtained by catalytic reforming of naphtha with a novel solid catalyst in the vapor phase at an elevated temperature, thereby selectively cracking alkyl substituted benzenes other than toluene and polymethyl benzenes contained in said mixture.

In place of said reformate, an aromatic extract from a reformate or a heavier fraction obtained by extraction and distillation of the reformate may be used. In the method of this invention, olefin gases, such as ethylene or propylene are obtained as by-products.

Main source for aromatic hydrocarbons, such as benzene, toluene and xylenes which are valuable raw materials in the chemical industry hitherto has been an extract from reformate (an oil obtained by catalytic reforming of naphtha) and cracked gasoline (an oil obtained by thermal cracking of naphtha). Aromatic hydrocarbon oil extracted from a reformate or a cracked gasoline generally contains a large amount of heavy aromatic hydrocarbons in addition to benzene, toluene and xylenes. These heavy aromatic hydrocarbons are aromatic hydrocarbon components having at least 9 carbon atoms and are referred to hereinafter as $C_9+A$. The $C_9+A$ contains many compounds which are similar in their boiling point and other properties and are therefore difficult to separate. Among these compounds there are several polymethyl benzenes which are very useful. Examples thereof are pseudocumene (1,2,4-trimethyl benzene) and durene (1,2,4,5-tetramethyl benzene) which are important as raw materials for the production of trimellitic acid and pyromellitic acid, respectively. These compounds are widely employed commercially. However, a greater number of components other than the aforesaid polymethyl benzenes have substantially no commercial value. These include compounds, such as alkyl substituted aromatic hydrocarbons containing usually 9 to 10 carbon atoms and having at least one nuclear substituted alkyl group containing at least 2 carbon atoms. Illustrative of such components of little or no commercial value are isopropyl benzene, n-propyl benzene, 1-methyl 2-ethyl benzene, 1-methyl 3-ethyl benzene, 1-methyl 4-ethyl benzene, four isomers of butyl benzenes, three isomers of cymenes (methylisopropyl benzenes), three isomers of methyl n-propyl benzenes, three isomers of diethyl benzenes, six isomers of dimethyl ethyl benzenes, and the like.

One well known method for utilizing $C_9+A$ comprises reacting hydrogen with it to produce benzene, toluene and xylenes. However, this method requires a large amount of expensive hydrogen.

It has also been proposed to react toluene with $C_9+A$ to produce xylenes by transalkylation. This method consumes mainly the expensive trimethyl benzenes.

For the above reasons, $C_9+A$, especially $C_9+A$ components other than polymethyl benzenes have not been fully utilized.

THE INVENTION

In accordance with this invention, a most effective procedure has been discovered for the utilization of $C_9+A$ to produce benzene, toluene and polymethyl benzenes, especially those containing up to four methyl groups, by a vapor phase reaction at elevated temperature in the presence of a novel catalyst.

It is one object of this invention to produce benzene, toluene and xylenes from the low value $C_9+A$ components, while avoiding excessive decomposition of valuable polymethyl benzenes. Most of the useful polymethyl benzenes are unconverted by the reaction. Thus, the reaction product substantially comprises a treated feed stock remarkably enriched in various polymethyl benzenes as well as benzene and toluene. Each component in the reaction product can easily be separated by distillation.

One valuable result of the practice of this invention is the recovery of a large amount of mesitylene (1,3,5-trimethyl benzene). This compound which is useful as a raw material for the production of trimestic acid is contained in the $C_9+A$ from a reformate. However, it has heretofore been impossible to directly separate substantially pure mesitylene from reformates. The reason is that the reformate contains a large amount of 1-methyl 2-ethyl benzene having a boiling point which differs from that of mesitylene by only 0.5° C. According to the method of this invention, separation of mesitylene can be easily effected. This is because 1-methyl 2-ethyl benzene is decomposed and removed from the $C_9+A$.

A particular advantage of this invention is that appreciable quantities of ethylene and propylene are produced as by-products. These products are of very significant commercial value. Additionally, there is minimum production of carbon. Previously known catalyst for this type of reaction have been associated with significant decomposition leading to excessive amounts of carbon with little or no production of ethylene or propylene.

This invention, in addition to providing a method for enriching selected feed stocks with polymethylated benzenes, also provides a method for enriching the feed stocks with the lower hydrocarbons, benzene, toluene and xylene.

The present invention provides a method for producing benzene, toluene, xylenes and other polymethylbenzenes by cracking aromatic fractions comprising mainly aromatic hydrocarbons having at least nine carbon atoms, usually nine to ten carbon atoms, which are further characterized as containing at least one nuclear alkyl substituent containing at least two carbon atoms. The process is carried out in the vapor phase at an elevated temperature in the presence of a novel catalyst.

The novel catalyst of the invention is an alumina catalyst activated by treatment with magnesium silicofluoride. The catalyst is characterized by excellent activity, high yields of the desired end products, and markedly decreased free carbon production compared with previously known hydrocarbon cracking catalysts. Further, the catalyst is highly selective with respect to dealkylation in that methyl groups are substantially unaffected while ethyl and higher alkyl groups are removed. They cause little or no hydrogenation of the compounds in the feed stock, even when hydrogen is used as a diluent.

Several catalysts are known and utilized for cracking aromatic hydrocarbon mixtures at elevated temperatures. One typical example is the silica-alumina catalyst now widely employed in commerce. A specific disadvantage of this catalyst is that it deposits a large amount of free carbon and provides only low yields of benzene and methyl benzenes. Activation of the alumina catalyst with, for example hydrogen fluoride or boron tetrafluoride improves dealkylation, especially in the presence of hydrogen. Unfortunately, however, there is concurrent and excessive hydrogenation and demethylation. The catalysts of this invention are, therefore, a significant advance in the art.

The presently preferred method for the preparation of the novel catalysts of this invention is to dip an activated, granulated alumina catalyst in an aqueous or methanolic solution of magnesium silicofluoride and to then dry and calcine the product. Typically, calcination will take place at a temperature of from about 400° C. to 600° C. during a period of from about one to ten hours. While one treatment is usually sufficient if a suitably concentrated solution is employed, the operation may be carried out several times to provide a product having the desired properties. Suitable catalysts within the scope of the invention contain from about 0.01% to 10% fluorine and 0.01% to 10% magnesium based on the total weight. Preferred catalysts from the standpoint of economy and yield contain 0.1% to 5% fluorine and 0.1% to 10% magnesium.

In practicing the method of this invention, the feed stock is previously heated and evaporated and is contacted with the catalyst bed in the vapor phase. It is often useful, but not essential in the practice of this invention to dilute the vapor of the feed stock with another vapor. Such dilution helps to reduce deposition of carbon on the catalyst. Hydrogen, nitrogen, steam, lower paraffinic hydrocarbons containing up to about three carbon atoms, such as methane, ethane, propane, and the like, or mixtures of such diluents may be used. Hydrogen or a gaseous mixture mainly composed of hydrogen may be conveniently used. It is preferable to dilute the vapor of the feed stock to at least 2 and up to about 100 times in volume.

A temperature of from about 400° C. to 700° C., preferably of 450° C. to 650° C., may be used as a reaction temperature. Excessively high temperatures may cause deterioration of the catalyst. On the other hand, if the temperature is too far below this range, the reaction is too slow for good commercial practice.

The optimum feeding rate of the feed stock mixture depends upon reaction conditions, the selected catalyst and the composition of the feed stock. It may be readily determined by a series of simple observations. In general, the feed stock is fed at a rate of 0.01 to 10 hr.$^{-1}$ expressed by liquid hourly space velocity per volume of catalyst (referred to as LHSV hereinafter).

In practicing the method of this invention, any of the various reactors normally employed for similar vapor phase catalytic reactions may be used. These include, for example, fixed bed, fluid bed and moving bed units.

Normal and elevated pressure may be employed in the reaction. However, when the pressure is too high, production of olefin is inhibited. Thus, a relatively low pressure of lower than 30 atms. should be chosen. Typically, the reaction is carried out at from about 1 to 30 atmospheres.

The activity of the catalyst is restored by passing an oxygen-containing gas, such as air, through the catalyst layer at an elevated temperature to burn and remove free carbon deposited thereon.

The following non-limiting examples are given by way of illustration only.

Example 1

20 grams of activated alumina of 8 to 10 mesh size in the form of amorphous, ground particles was dipped in 100 ml. of a 35% aqueous $MgSiF_6 \cdot 6H_2O$ solution (weight/weight basis in this and subsequent examples) and was allowed to stand for 36 hours at room temperature. The alumina was dried on a water bath and calcined at 500° C. for 3 hours. The catalyst thus obtained (F=about 2%, magnesium about 1.5%) was packed in a fixed bed type reactor. A mixture of $C_9+A$ obtained from a reformate and having boiling points above 148° C. was passed through the reactor together with hydrogen gas in an amount of 10 times (mol) as much as the feed stock mixture at a rate of 0.5 hr.$^{-1}$ of LHSV at 550° C. under 19 kg./cm.$^2$ gauge.

Table 1 shows compositions of feed stock $C_9+A$ and of the resulting product. The feed stock contains the following compounds, amongst others:

1-methyl 2-n-propyl benzene,
1-methyl 3-n-propyl benzene,
1-methyl 4-n-propyl benzene,
1,2-diethyl benzene,
1,3-diethyl benzene,
1,4-diethyl benzene,
n-butyl benzene,
1,3-dimethyl 5-ethyl benzene,
1,4-dimethyl 2-ethyl benzene,
1,3-dimethyl 4-ethyl benzene,
1,2-dimethyl 3-ethyl benzene,
1,3-dimethyl 2-ethyl benzene,
1,2-dimethyl 4-ethyl benzene,
1,2,4,5-tetramethyl benzene,
1,2,3,5-tetramethyl benzene, etc.

Example 2

Example 1 was repeated, except that the catalytic reaction was conducted at 600° C. and LHSV was 1.0 hr.$^{-1}$. Results are shown in Table 1.

EXAMPLE 3

Example 1 was repeated, except that the catalytic reaction was effected at 470° C. Results are shown in Table 1.

TABLE 1

| | Feed stock | Example | | |
|---|---|---|---|---|
| | | 1 | 2 | 3 |
| Composition (wt. percent): | | | | |
| Benzene | | 4.0 | 3.16 | 2.02 |
| Toluene | | 23.4 | 18.6 | 12.7 |
| Xylenes (including ethyl benzene) | | 35.8 | 28.5 | 20.3 |
| Propyl benzene | 2.7 | 0 | 0 | 0.5 |
| Ethyl toluenes | 21.3 | 3.4 | 6.38 | 11.2 |
| Triethyl benzenes | 36.4 | 23.6 | 21.9 | 26.0 |
| $C_{10}+A$ | 39.6 | 9.9 | 21.9 | 28.6 |
| Yield (percent) | | 71.1 | 75.7 | 95.5 |

From the results in the table, it will be observed that mixed products are produced containing substantial amounts of benzene and methylated benzene from feed stocks containing no detectable quantities of these products, and that the amounts of higher alkylated benzenes are substantially reduced.

EXAMPLES 4–8

20 grams of the same alumina used in Example 1 was dipped in 100 ml. of 35% aqueous solution of $MgSiF_6 \cdot 6H_2O$ and was allowed to stand for 36 hours at room temperature. Thereafter, the thus treated alumina was dried on a water bath and then calcined at 500° C. for 3 hours. The catalyst thus obtained (F=about 2%, magnesium about 1.5%) was charged in a fixed bed type reactor, into which a mixture of $C_9+A$ obtained from a reformate whose composition is shown in Table 2, was supplied at a rate of LHSV of 0.5 hr.$^{-1}$ at 550° C. under 19 kg./cm.$^2$ gauge.

In Example 5, vapor of the feed stock was diluted with nitrogen gas in a molar ratio of 10 to 1. In Example 5, the feed stock was diluted with hydrogen gas in a molar ratio of 60:1.

For comparison, Example 6 was carried out under the same conditions as in Example 4 except that commercially available silica-alumina catalyst was used. The results obtained after reactions of 30 minutes, 4 hours and 8 hours are shown in Table 2.

TABLE 2

| Compositions of liquid (weight percent) | Feed stock | Example 4 Time (hours) ½ | 4 | Example 5 Time (hours) ½ | 8 | Example 6 Time (hours) ½ | 4 |
|---|---|---|---|---|---|---|---|
| Benzene | | 4.4 | 2.2 | 4.3 | 4.1 | 2.3 | 0.9 |
| Toluene | | 25.1 | 14.0 | 23.8 | 22.1 | 15.1 | 7.5 |
| Ethyl benzene | | 0.8 | 1.4 | 1.0 | 1.2 | 1.0 | 1.0 |
| Xylenes | | 19.1 | 14.1 | 16.4 | 17.2 | 10.3 | 7.5 |
| n-Propyl benzene | 2.6 | | | 0.14 | 0.10 | | |
| p-Ethyl toluene | 5.1 | | | 1.3 | 1.3 | | |
| m-Ethyl toluene | 14.8 | | | 2.8 | 2.9 | | |
| o-Ethyl toluene | 5.3 | | | 0.57 | 0.7 | | |
| Mesitylene | 7.3 | | | 5.3 | 5.3 | | |
| Pseudocumene | 33.0 | 23.1 | 32.0 | 23.8 | 24.0 | 31.2 | 34.0 |
| Hemimellitene and Indane | 10.6 | | | 10.5 | 10.8 | | |
| Others (mainly $C_{10}+A$) | 21.3 | | | 8.8 | 8.7 | | |

It will be observed that appreciably larger amounts of the desired products were produced using the catalyst of this invention than were produced with the conventional catalyst. The products were produced with lesser amounts of demethylation, hydrogenation and free carbon production.

EXAMPLE 7

Example 1 was repeated, except that the catalyst used was a conventional silica-alumina catalyst containing 28% $Al_2O_3$.

EXAMPLE 8

Example 1 was repeated, except that the catalyst used was one which had been dipped in a 3% HF solution for 18 hours, dried and calcined at 500° C. for 3 hours.

EXAMPLE 9

Example 1 was repeated, except that the catalyst used was one which had been dipped in a 10% solution of $BF_3$ in ethyl ether for 1 hour, dried and calcined at 500° C. for 3 hours.

The results obtained in comparative Examples 7, 8 and 9 are tabulated in Table 3.

TABLE 3

| | Feed stock | Comparative example 7 | 8 | 9 |
|---|---|---|---|---|
| Composition (wt. percent): | | | | |
| Benzene | | 1.67 | 4.71 | 2.45 |
| Toluene | | 10.6 | 16.1 | 16.5 |
| Xylenes and ethylbenzenes | | 17.1 | 12.1 | 24.2 |
| Propylbenzenes | 2.7 | 0 | 0.5 | 0 |
| Ethyltoluene | 21.3 | 6.22 | 7.2 | 6.4 |
| Trimethylbenzenes | 36.4 | 15.3 | 12.7 | 18.8 |
| $C_{10}+A$ | 39.6 | 10.3 | 18.4 | 8.2 |
| Yield (percent) | | 61.2 | 71.7 | 76.6 |

The deficiences of these catalysts of the prior arts is readily apparent from this table. While there is some dealkylation, there is little selectivity in the alkyl groups which are removed. Moreover, there is substantial decomposition of the feed stock to produce free carbon as evidenced by the low yields.

The gases formed in the reactions of Example 1 and these comparative examples were analyzed. The process of Example 1 produced a gaseous mixture containing 3.4%, 2.4% and 2.4% respectively of ethylene, ethane and methane based on the weight of feed stock. In the comparative examples only 0.3% of ethylene was produced in Example 7, and none was detected in Examples 8 and 9.

What is claimed is:

1. A method for producing benzene, toluene and polymethyl benzenes which comprises contacting a feed stock comprising mainly aromatic hydrocarbons having at least 9 carbon atoms and at least one nuclear substituent containing at least two carbons atoms in the vapor phase at an elevated temperature with a catalyst comprising magnesium silicofluoride treated active alumina containing from about 0.01% to 10% fluorine and from about 0.01% to 10% magnesium by weight based on the total weight.

2. A method for producing benzene, toluene and xylenes in accordance with Claim 1, wherein the feed stock consists substantially of only aromatic hydrocarbons having at least 9 carbon atoms.

3. A method as in Claim 1 wherein the feed stock is a reformate obtained by catalytic reforming of naphtha.

4. A method as in Claim 1 wherein the reaction temperature is from about 400° C. to 700° C., the reaction pressure is from about 1 to 30 atmospheres and the vapor of the feed stock is diluted with at least twice its volume of hydrogen.

5. A method as in Claim 1 wherein the feed stock is diluted with from at least 2 to about 100 times its volume with a diluent comprising hydrogen, nitrogen, steam or a lower paraffinic hydrocarbon containing up to about 3 carbon atoms, or with mixtures of such diluents.

6. A method according to Claim 1 wherein the catalyst contains from 0.1% to 5% fluorine and 0.1% to 10% magnesium.

References Cited

UNITED STATES PATENTS

| 3,071,539 | 1/1963 | Porter et al. | 208—135 |
| 3,310,597 | 3/1967 | Goble et al. | 260—672 |
| 3,404,097 | 10/1968 | Wilson et al. | 252—441 |
| 3,413,374 | 11/1968 | Sato et al. | 260—672 T |

FOREIGN PATENTS

| 458,125 | 7/1949 | Canada | 260—672 T |
| 458,126 | 7/1949 | Canada | 260—672 T |

CURTIS R. DAVIS, Primary Examiner